(12) United States Patent
Kojima et al.

(10) Patent No.: US 11,821,458 B2
(45) Date of Patent: Nov. 21, 2023

(54) REFRIGERANT-CHANNEL BRANCHING COMPONENT, AND REFRIGERATION APPARATUS INCLUDING REFRIGERANT-CHANNEL BRANCHING COMPONENT

(71) Applicant: Daikin Industries, LTD., Osaka (JP)

(72) Inventors: Makoto Kojima, Osaka (JP); Takuro Yamada, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 625 days.

(21) Appl. No.: 16/619,330

(22) PCT Filed: Jul. 17, 2018

(86) PCT No.: PCT/JP2018/026741
§ 371 (c)(1),
(2) Date: Dec. 4, 2019

(87) PCT Pub. No.: WO2019/017342
PCT Pub. Date: Jan. 24, 2019

(65) Prior Publication Data
US 2020/0116400 A1    Apr. 16, 2020

(30) Foreign Application Priority Data
Jul. 21, 2017 (JP) ................ 2017-141935

(51) Int. Cl.
*F25B 41/40* (2021.01)
*F16B 7/04* (2006.01)
(Continued)

(52) U.S. Cl.
CPC ........... *F16B 7/0413* (2013.01); *F16B 7/025* (2013.01); *F25B 41/39* (2021.01); *F25B 41/40* (2021.01); *F25B 41/42* (2021.01)

(58) Field of Classification Search
CPC ........ F16B 7/0413; F16B 7/025; F25B 41/40; F25B 41/42; F25B 41/45; F25B 41/48
See application file for complete search history.

(56) References Cited

U.S. PATENT DOCUMENTS 5,148,597 A * 9/1992 Weeks ................ F01N 13/18
                                        72/348
5,794,452 A * 8/1998 Black ................... F25B 47/022
                                        62/352
(Continued)

FOREIGN PATENT DOCUMENTS

EP      2578967 A2 * 4/2013 ............ F25B 39/028
GB      2326453 A * 12/1998
(Continued)

OTHER PUBLICATIONS

Murata, Pipe Joint Structure, 2008 (JP-2008232386-A) including English translation (Year: 2008).*
(Continued)

*Primary Examiner* — Miguel A Diaz
(74) *Attorney, Agent, or Firm* — Osha Bergman Watanabe & Burton LLP

(57) ABSTRACT

A refrigerant-channel branching component for connecting a connection pipe connected to an outdoor unit with a connection pipe directed toward a plurality of indoor units, the refrigerant-channel branching component includes: an inlet portion; and outlet portions. At least one of the plurality of outlet portions includes: a reference space into which a reference connection pipe with a predetermined outside diameter is inserted; a first space that is adjacent to the reference space and has an inside diameter greater than an inside diameter of the reference connection pipe; and a second space that is adjacent to the first space and has an inside diameter greater than the inside diameter of the first space.

8 Claims, 5 Drawing Sheets

(51) Int. Cl.
*F16B 7/02* (2006.01)
*F25B 41/42* (2021.01)
*F25B 41/39* (2021.01)

(56) References Cited

U.S. PATENT DOCUMENTS

| | | | | |
|---|---|---|---|---|
| 5,927,093 A * | 7/1999 | Noguchi | F24F 1/32 | 62/504 |
| 6,023,940 A * | 2/2000 | Abbott | F25B 39/028 | 62/317 |
| 6,216,817 B1 * | 4/2001 | Kannon | G10K 11/16 | 427/508 |
| 6,427,484 B1 * | 8/2002 | Choi | F24F 1/32 | 62/78 |
| 7,036,328 B2 * | 5/2006 | Shin | F25B 41/40 | 181/207 |
| 7,152,885 B2 * | 12/2006 | Takamatsu | B23K 1/0012 | 285/124.1 |
| 7,350,823 B2 * | 4/2008 | Ichimura | B21D 41/021 | 285/123.3 |
| 7,600,393 B2 * | 10/2009 | Kim | F25B 41/45 | 62/504 |
| 8,091,377 B2 * | 1/2012 | Jeong | F25B 13/00 | 62/200 |
| 8,966,923 B2 * | 3/2015 | Haussmann | F25B 41/45 | 62/299 |
| 9,605,862 B2 * | 3/2017 | Eguchi | F25B 40/02 | |
| 9,851,132 B2 * | 12/2017 | Kawano | F25B 41/20 | |
| 10,415,860 B2 * | 9/2019 | Tanaka | F25B 1/00 | |
| 10,443,866 B2 * | 10/2019 | Nakatsu | F25B 41/40 | |
| 10,557,648 B2 * | 2/2020 | Naito | F24F 11/36 | |
| 10,907,871 B2 * | 2/2021 | Kinoshita | F25B 13/00 | |
| 2001/0037649 A1 | 11/2001 | Fujitaka et al. | | |
| 2003/0230107 A1 * | 12/2003 | Lee | F25B 13/00 | 62/504 |
| 2005/0050911 A1 * | 3/2005 | Shin | F25B 13/00 | 62/324.6 |
| 2005/0161943 A1 * | 7/2005 | Takamatsu | F16L 39/00 | 285/288.1 |
| 2006/0201197 A1 * | 9/2006 | Kim | F25B 39/028 | 62/504 |
| 2006/0284412 A1 | 12/2006 | Shipman | | |
| 2007/0113582 A1 | 5/2007 | Sao et al. | | |
| 2009/0241577 A1 * | 10/2009 | Fukushima | F25B 49/005 | 700/275 |
| 2010/0199695 A1 * | 8/2010 | Shinozaki | F24F 1/26 | 62/238.7 |
| 2011/0023512 A1 * | 2/2011 | Kawagoe | F25B 13/00 | 62/196.1 |
| 2011/0061413 A1 * | 3/2011 | Setoguchi | F25B 1/10 | 62/238.7 |
| 2011/0219804 A1 * | 9/2011 | Park | F25B 13/00 | 62/259.1 |
| 2012/0036887 A1 * | 2/2012 | Wakamoto | F25B 13/00 | 62/513 |
| 2012/0292006 A1 * | 11/2012 | Yamashita | F24F 3/06 | 165/200 |
| 2014/0373569 A1 * | 12/2014 | Tsuboe | F25B 41/40 | 62/498 |
| 2015/0211802 A1 * | 7/2015 | Yokozeki | F28D 1/0475 | 165/104.14 |
| 2015/0285530 A1 * | 10/2015 | Honda | F24F 11/89 | 62/216 |
| 2015/0292780 A1 * | 10/2015 | Kitamura | F25B 41/40 | 62/324.1 |
| 2015/0300666 A1 * | 10/2015 | Kawano | F24F 5/001 | 29/890.035 |
| 2015/0345842 A1 * | 12/2015 | Kawano | F24F 3/08 | 62/196.1 |
| 2016/0003488 A1 * | 1/2016 | Nakatsu | F25B 41/40 | 137/375 |
| 2016/0146496 A1 | 5/2016 | Yamashita | | |
| 2016/0341453 A1 * | 11/2016 | Yamashita | F28F 13/12 | |
| 2016/0356516 A1 * | 12/2016 | Eguchi | F24F 1/32 | |
| 2017/0010027 A1 * | 1/2017 | Liu | F25B 41/20 | |
| 2017/0067697 A1 * | 3/2017 | Xue | F25B 41/42 | |
| 2017/0121581 A1 | 5/2017 | Horiike et al. | | |
| 2017/0198946 A1 * | 7/2017 | Takenaka | F25B 41/24 | |
| 2018/0017293 A1 * | 1/2018 | Naito | F25B 49/02 | |
| 2018/0095483 A1 * | 4/2018 | Tokudi | F24F 11/80 | |
| 2018/0112899 A1 * | 4/2018 | Masahiro | F25B 41/40 | |
| 2018/0195783 A1 * | 7/2018 | Jung | F25B 49/02 | |
| 2018/0216858 A1 * | 8/2018 | Higashiiue | F28F 13/08 | |
| 2018/0259219 A1 * | 9/2018 | Motomura | F24F 11/89 | |
| 2018/0274829 A1 * | 9/2018 | Thobias | F25B 41/40 | |
| 2018/0335174 A1 * | 11/2018 | Kakinuma | F16L 41/021 | |
| 2018/0372379 A1 | 12/2018 | Kamitani et al. | | |
| 2019/0048240 A1 * | 2/2019 | Tanaka | F25B 13/00 | |
| 2019/0063792 A1 * | 2/2019 | Kim | F25B 13/00 | |
| 2019/0093931 A1 * | 3/2019 | Kinoshita | F25B 13/00 | |
| 2019/0113244 A1 * | 4/2019 | Akaiwa | F25B 41/45 | |
| 2019/0376727 A1 * | 12/2019 | Tamura | F24F 11/49 | |
| 2019/0383522 A1 * | 12/2019 | Shiohama | F24F 1/0068 | |
| 2020/0116400 A1 * | 4/2020 | Kojima | F16L 55/033 | |
| 2020/0166257 A1 * | 5/2020 | Wada | F25B 49/02 | |
| 2020/0182516 A1 * | 6/2020 | Maruyama | F24F 11/83 | |
| 2020/0271333 A1 * | 8/2020 | Miyawaki | F25B 13/00 | |
| 2020/0271344 A1 * | 8/2020 | Ikeda | F24F 11/36 | |
| 2020/0284444 A1 * | 9/2020 | Shirasaki | F16L 55/24 | |
| 2020/0393178 A1 * | 12/2020 | Kumakura | C09K 5/045 | |
| 2021/0123638 A1 * | 4/2021 | Yoshioka | F25B 13/00 | |
| 2021/0131706 A1 * | 5/2021 | Yamada | F24F 11/84 | |
| 2021/0302079 A1 * | 9/2021 | Bryant | F16L 13/103 | |

FOREIGN PATENT DOCUMENTS

| | | | | |
|---|---|---|---|---|
| JP | H07120104 A | * | 5/1995 | |
| JP | 11125379 A | * | 5/1999 | F16L 41/02 |
| JP | 2002243314 A | * | 8/2002 | |
| JP | 2003214727 A | * | 7/2003 | |
| JP | 2005-221229 A | | 8/2005 | |
| JP | 2005-337524 A | | 12/2005 | |
| JP | 2008-232386 A | | 10/2008 | |
| JP | 2008232201 A | * | 10/2008 | |
| JP | 2017150706 A | * | 8/2017 | |
| JP | 2018040548 A | * | 3/2018 | |
| KR | 10-2014-0134356 A | | 11/2014 | |
| WO | 2015/029160 A1 | | 3/2015 | |
| WO | 2015/140827 A1 | | 9/2015 | |
| WO | 2016/204194 A1 | | 12/2016 | |

OTHER PUBLICATIONS

Notification of Transmittal of Translation of the International Preliminary Report on Patentability for Application No. PCT/JP2018/026741 dated Jan. 30, 2020 (1 page).

International Search Report issued in corresponding International Application No. PCT/JP2018/026741 dated Oct. 23, 2018, with translation (5 pages).

International Preliminary Report on Patentability issued in corresponding International Application No. PCT/JP2018/026741 dated Jan. 21, 2020 (13 pages).

Extended European Search Report issued in the counterpart European Patent Application No. 18835869.1, dated Mar. 19, 2021 (8 pages).

* cited by examiner

REFRIGERANT-CHANNEL BRANCHING COMPONENT, AND REFRIGERATION APPARATUS INCLUDING REFRIGERANT-CHANNEL BRANCHING COMPONENT

TECHNICAL FIELD

The present invention relates to a refrigerant-channel branching component including a single inlet and a plurality of outlets.

BACKGROUND

Refrigerant-saving air conditioners reduce refrigerant in a pipe by decompressing liquid refrigerant from an outdoor unit once to turn the liquid refrigerant into a gas-liquid two-phase state for transport (to be referred to as "two-phase transport" hereinafter). For example, such an air conditioner is disclosed in Patent Literature 1 (International Publication No. 2015/029160). In the air conditioner, an outdoor liquid-refrigerant pipe, which connects an outdoor heat exchanger with a liquid-refrigerant connection pipe, is provided with a liquid-pressure-regulating expansion valve to decompress refrigerant such that the refrigerant flows through the liquid-refrigerant connection pipe in a gas-liquid two-phase state. This configuration enables two-phase transport of refrigerant in which, when refrigerant discharged from a compressor is passed through the outdoor heat exchanger, the liquid-refrigerant connection pipe, and an indoor heat exchanger in this order, the refrigerant is decompressed by the liquid-pressure-regulating expansion valve into the refrigerant in a gas-liquid two-phase state, and the refrigerant in the gas-liquid two-phase state is delivered from the outdoor unit toward the indoor unit through the liquid-refrigerant connection pipe.

In the above-mentioned air conditioner, refrigerant from the outdoor unit is delivered into a plurality of indoor units in a parallel fashion by the liquid-refrigerant connection pipe. Accordingly, by using a refrigerant-channel branching pipe with a single inlet and a plurality of outlets, the refrigerant is divided into separate streams while splitting the liquid-refrigerant connection pipe into branches. Accordingly, if, for example, a ¼-inch pipe and a ⅜-inch pipe are connected, the contraction ratio of channel cross-sectional area increases, which can cause unwanted noise in the outlet portion.

PATENT LITERATURE

[Patent Literature 1]: International Publication No. 2015/029160

SUMMARY

One or more embodiments of the present invention provide a refrigerant-channel branching pipe capable of reducing noise in its outlet portion.

A refrigerant-channel branching component according to one or more embodiments of the present invention is a refrigerant-channel branching component for connecting a connection pipe connected to an outdoor unit, with a connection pipe directed toward a plurality of indoor units, the refrigerant-channel branching component including an inlet portion and a plurality of outlet portions.

At least one of the outlet portions includes a reference space, a first space, and a second space. A reference connection pipe with a predetermined outside diameter is inserted into the reference space. With the reference connection pipe being inserted in the reference space, the first space is located adjacent to the reference space, and has an inside diameter greater than the inside diameter of the reference connection pipe. The second space is adjacent to the first space, and has an inside diameter greater than the inside diameter of the first space.

With the above-mentioned refrigerant-channel branching component, the channel cross-sectional area in the outlet portion decreases in the order of the second space, the first space, and the reference space. This configuration ensures that the flow of refrigerant is constricted stepwise, and consequently prevents the channel cross-sectional area from being constricted all at once, thus reducing the occurrence of "bubble clogging" and "pressure fluctuations".

In a refrigerant-channel branching component according to one or more embodiments of the present invention, the reference connection pipe is a ¼-inch pipe. A connection pipe with a large diameter that corresponds to the second space is a ⅜-inch pipe.

With the above-mentioned refrigerant-channel branching component, when it is desired to connect each outlet portion with a ¼-inch pipe, this connection can be achieved by inserting the ¼-inch pipe into the reference space. When it is desired to connect each outlet portion with a ⅜-inch pipe, this connection can be achieved by cutting, at some midpoint, a pipe defining the second space, and inserting the ⅜-inch pipe into the cut pipe.

In a refrigerant-channel branching component according to one or more embodiments of the present invention, the percentage of contraction in channel cross-sectional area from the second space to the first space, and the percentage of contraction in channel cross-sectional area from the first space to the interior of the reference connection pipe are less than the percentage of contraction from the area of a circle with a diameter equal to the outside diameter of the ⅜-inch pipe to the area of a circle with a diameter equal to the inside diameter of the ¼-inch pipe.

With the above-mentioned refrigerant-channel branching component, it allows for gradual contraction of channel cross-sectional area, thus preventing the channel cross-sectional area from being constricted all at once.

In a refrigerant-channel branching component according to one or more embodiments of the present invention, a first pipe portion that forms a pipe defining the first space has an outside diameter of 2.5/8 inch.

With the above-mentioned refrigerant-channel branching component, when refrigerant travels from the second space into the reference connection pipe inserted in the reference space, the refrigerant flows in the same state as when passing through a 2.5/8-inch pipe once. This configuration allows for gradual contraction of the channel cross-sectional area, thus preventing the channel cross-section area from being constricted all at once.

In a refrigerant-channel branching component according to one or more embodiments of the present invention, a second pipe portion that forms a pipe defining the second space, and a first pipe portion that forms a pipe defining the first space are separate from each other.

In this regard, if the second pipe portion and the first pipe portion are formed integrally, the respective dimensions of the second pipe portion and the first pipe portion in the direction of refrigerant flow are subject to manufacturing restrictions. By contrast, with the above-mentioned refrigerant-channel branching component, the second pipe portion and the first pipe portion are formed separately, and thus the respective dimensions of the second pipe portion and the first pipe portion in the direction of refrigerant flow can be set freely irrespective of the manufacturing method used.

In a refrigerant-channel branching component according to one or more embodiments of the present invention, a reference pipe portion that forms a pipe defining the reference space has a dimension in the direction of refrigerant flow greater than the insertion length of the reference connection pipe into the reference space.

In a refrigerant-channel branching component according to one or more embodiments of the present invention, the first space has a dimension of greater than or equal to 10 mm in the direction of refrigerant flow.

In a refrigeration apparatus according to one or more embodiments of the present invention, the refrigeration apparatus includes the refrigerant-channel branching component according to any one of the above-described embodiments of the present invention.

With the above-mentioned refrigeration apparatus, the channel cross-sectional area in the outlet portion of the refrigerant-channel branching component decreases in the order of the second space, the first space, and the reference space. This configuration ensures that the flow of refrigerant is constricted stepwise, and consequently prevents the channel cross-sectional area from being constricted all at once.

In the refrigerant-channel branching component according to the present invention, the channel cross-sectional area in the outlet portion decreases in the order of the second space, the first space, and the reference space. This configuration ensures that the flow of refrigerant is constricted stepwise, and consequently prevents the channel cross-sectional area from being constricted all at once, thus reducing the occurrence of "bubble clogging" and "pressure fluctuations".

When it is desired to connect the outlet portion with a large-diameter connection pipe having an outside diameter greater than the outside diameter of the reference connection pipe, this connection can be achieved by cutting, at some midpoint, a pipe defining the second space, and inserting the large-diameter connection pipe into the cut pipe.

DETAILED DESCRIPTION

Embodiments of the present invention will be described below with reference to the drawings. The embodiments below are specific examples of the present invention and not intended to limit the technical scope of the present invention.

(1) Configuration of Air Conditioner 1

Figure 1:
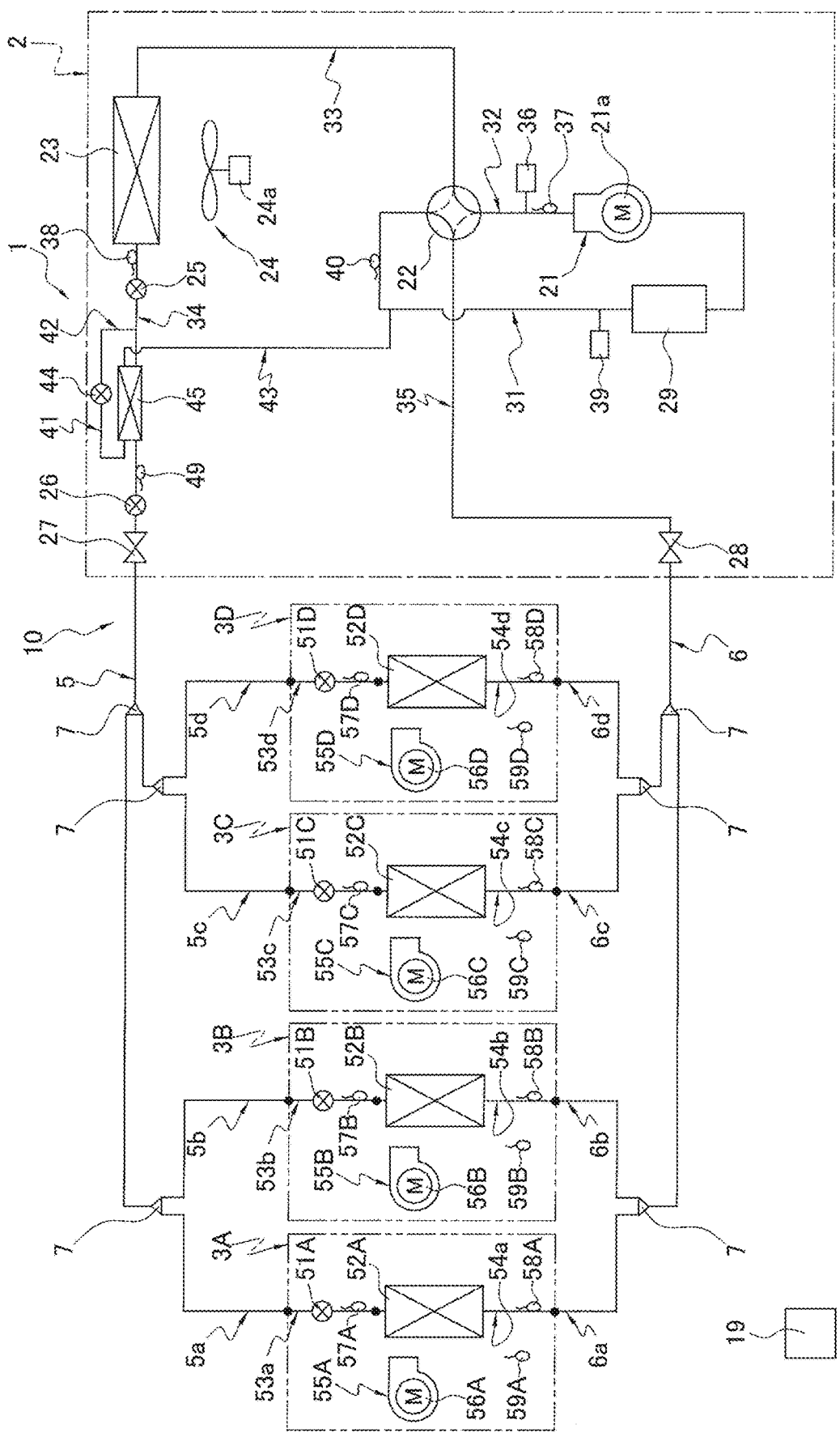
FIG. 1 is a schematic configuration of an air conditioner employing a refrigerant-channel branching component according to one or more embodiments of the present invention.

FIG. 1 illustrates a schematic configuration of an air conditioner 1 employing a refrigerant-channel branching component according to one or more embodiments of the present invention. The air conditioner 1 utilizes a vapor compression refrigeration cycle to cool or heat an indoor space of a building or other such structure.

The air conditioner 1 includes, as its main components, an outdoor unit 2, a plurality of (four in this example) indoor units 3A, 3B, 3C, and 3D connected in parallel with each other, a liquid-refrigerant connection pipe 5 and a gas-refrigerant connection pipe 6 that connect the outdoor unit 2 with the indoor units 3A, 3B, 3C, and 3D, and a control unit 19 that controls the respective component devices of the outdoor unit 2 and the indoor units 3A, 3B, 3C, and 3D.

A refrigerant circuit 10, which is a vapor compression refrigerant circuit of the air conditioner 1, is formed by connecting the outdoor unit 2 with the indoor units 3A, 3B, 3C, and 3D via the liquid-refrigerant connection pipe 5 and the gas-refrigerant connection pipe 6. The refrigerant circuit 10 is filled with a refrigerant such as R32.

(2) Outdoor Unit 2

The outdoor unit 2 is installed in an outdoor space of a building or other such structure. The outdoor unit 2 is connected to the indoor units 3A, 3B, 3C, and 3D via the liquid-refrigerant connection pipe 5 and the gas-refrigerant connection pipe 6 as described above. The outdoor unit 2 constitutes a portion of the refrigerant circuit 10.

The outdoor unit 2 includes a compressor 21, and an outdoor heat exchanger 23 as its main components. The outdoor unit 2 also includes a switching mechanism 22. The switching mechanism 22 switches between a radiation operation state in which the outdoor heat exchanger 23 is caused to function as a radiator for refrigerant, and an evaporation operation state in which the outdoor heat exchanger 23 is caused to function as an evaporator for refrigerant.

The switching mechanism 22 and the suction side of the compressor 21 are connected to each other by a suction refrigerant pipe 31. The suction refrigerant pipe 31 is provided with an accumulator 29 for temporarily accumulating the refrigerant to be sucked into the compressor 21.

The discharge side of the compressor 21 and the switching mechanism 22 are connected to each other by a discharge refrigerant pipe 32. The switching mechanism 22 and the gas-side end of the outdoor heat exchanger 23 are connected to each other by a first outdoor gas-refrigerant pipe 33. The liquid-side end of the outdoor heat exchanger 23 and the liquid-refrigerant connection pipe 5 are connected to each other by an outdoor liquid-refrigerant pipe 34.

A liquid-side shutoff valve 27 is provided at the connection of the outdoor liquid-refrigerant pipe 34 with the liquid-refrigerant connection pipe 5. The switching mechanism 22 and the gas-refrigerant connection pipe 6 are connected to each other by a second outdoor gas-refrigerant pipe 35.

A gas-side shutoff valve 28 is provided at the connection of the second outdoor gas-refrigerant pipe 35 with the gas-refrigerant connection pipe 6. The liquid-side shutoff valve 27 and the gas-side shutoff valve 28 are valves that are opened and closed manually.

(2-1) Compressor 21

The compressor 21 is a device for compressing refrigerant. An example of the compressor 21 is a compressor with a hermetically sealed structure with a rotary, scroll, or other type of positive displacement compression element (not illustrated) rotatably driven by a compressor motor 21a.

(2-2) Switching Mechanism 22

The switching mechanism 22 is a device capable of switching the flows of refrigerant in the refrigerant circuit 10 such that, when the outdoor heat exchanger 23 is caused to function as a radiator for refrigerant (to be referred to as "outdoor radiation state" hereinafter), the switching mechanism 22 connects the discharge side of the compressor 21 with the gas side of the outdoor heat exchanger 23 (see the solid lines inside the switching mechanism 22 in FIG. 1), and when the outdoor heat exchanger 23 is caused to function as an evaporator for refrigerant (to be referred to as "outdoor evaporation state" hereinafter), the switching mechanism 22 connects the suction side of the compressor 21 with the gas side of the outdoor heat exchanger 23 (see the dashed lines inside the switching mechanism 22 in FIG. 1). The switching mechanism 22 is, for example, a four-way switching valve.

In cooling operation, the switching mechanism 22 is switched to the outdoor radiation state, and in heating operation, the switching mechanism 22 is switched to the outdoor evaporation state.

(2-3) Outdoor Heat Exchanger 23

The outdoor heat exchanger 23 is a heat exchanger that functions as a radiator for refrigerant, or functions as an evaporator for refrigerant.

(2-4) Outdoor Fan 24

The outdoor unit 2 includes an outdoor fan 24. The outdoor fan 24 supplies the outdoor heat exchanger 23 with outdoor air serving as a cooling source or heating source for the refrigerant flowing through the outdoor heat exchanger 23. The outdoor fan 24 is driven by an outdoor-fan motor 24a.

(2-5) Outdoor Expansion Valve 25 and Liquid-Pressure-Regulating Expansion Valve 26

The outdoor liquid-refrigerant pipe 34 is provided with an outdoor expansion valve 25, and a liquid-pressure-regulating expansion valve 26. The outdoor expansion valve 25 is an electric expansion valve that decompresses refrigerant during heating operation. The outdoor expansion valve 25 is located in a portion of the outdoor liquid-refrigerant pipe 34 proximate to the liquid-side end of the outdoor heat exchanger 23.

The liquid-pressure-regulating expansion valve 26 is an electric expansion valve that, during cooling operation, decompresses refrigerant such that the refrigerant flows through the liquid-refrigerant connection pipe 5 in a gas-liquid two-phase state. The liquid-pressure-regulating expansion valve 26 is located in a portion of the outdoor liquid-refrigerant pipe 34 proximate to the liquid-refrigerant connection pipe 5. In other words, the liquid-pressure-regulating expansion valve 26 is located in a portion of the outdoor liquid-refrigerant pipe 34 between the liquid-refrigerant connection pipe 5 and the outdoor expansion valve 25.

During cooling operation of the air conditioner 1, two-phase transport of refrigerant is performed in which, by using the liquid-pressure-regulating expansion valve 26, refrigerant in a gas-liquid two-phase state is delivered from the outdoor unit 2 toward the indoor units 3A, 3B, 3C, and 3D through the liquid-refrigerant connection pipe 5.

(2-6) Refrigerant Return Pipe 41

The outdoor liquid-refrigerant pipe 34 is connected with a refrigerant return pipe 41. The refrigerant return pipe 41 includes, as its main components, a refrigerant return inlet pipe 42, and a refrigerant-return outlet pipe 43.

The refrigerant return inlet pipe 42 causes a portion of refrigerant flowing through the outdoor liquid-refrigerant pipe 34 to branch off from an area between the liquid-side end of the outdoor heat exchanger 23 and the liquid-pressure-regulating expansion valve 26 (which in this case is an area between the outdoor expansion valve 25 and a refrigerant cooler 45), and delivers the branched portion of refrigerant to an inlet of the refrigerant cooler 45 located proximate to the refrigerant return pipe 41. The refrigerant return inlet pipe 42 is provided with a refrigerant-return expansion valve 44 that regulates the flow rate of refrigerant flowing through the refrigerant cooler 45 while decompressing refrigerant flowing through the refrigerant return pipe 41. The refrigerant-return expansion valve 44 is implemented by an electric expansion valve.

The refrigerant-return outlet pipe 43 delivers refrigerant to the suction refrigerant pipe 31 from an outlet of the refrigerant cooler 45 located proximate to the refrigerant return pipe 41. The refrigerant-return outlet pipe 43 of the refrigerant return pipe 41 is connected to a portion of the suction refrigerant pipe 31 located on the inlet side of the accumulator 29.

(2-7) Refrigerant Cooler 45

The refrigerant cooler 45 is a heat exchanger that, by using refrigerant flowing through the refrigerant return pipe 41, cools refrigerant flowing through a portion of the outdoor liquid-refrigerant pipe 34 located between the outdoor heat exchanger 23 and the liquid-pressure-regulating expansion valve 26. In the refrigerant cooler 45, the flow of refrigerant through the refrigerant return pipe 41, and the flow of refrigerant through the outdoor liquid-refrigerant pipe 34 are counter-flows during cooling operation.

(2-8) Various Sensors

The outdoor unit 2 is provided with a discharge pressure sensor 36, a discharge temperature sensor 37, a suction pressure sensor 39, a suction temperature sensor 40, an outdoor heat-exchanger liquid-side sensor 38, and a liquid-pipe temperature sensor 49.

The discharge pressure sensor 36 detects the pressure of the refrigerant discharged from the compressor 21. The discharge temperature sensor 37 detects the temperature of the refrigerant discharged from the compressor 21. The suction pressure sensor 39 detects the pressure of the refrigerant to be sucked into the compressor 21. The suction temperature sensor 40 detects the temperature of the refrigerant to be sucked into the compressor 21. The outdoor heat-exchanger liquid-side sensor 38 detects the temperature of the refrigerant at the liquid-side end of the outdoor heat exchanger 23. The liquid-pipe temperature sensor 49 detects the temperature of the refrigerant in a portion of the outdoor liquid-refrigerant pipe 34 between the refrigerant cooler 45 and the liquid-pressure-regulating expansion valve 26.

(3) Indoor Units 3A, 3B, 3C, and 3D

The indoor units 3A, 3B, 3C, and 3D are installed in an indoor space of a building or other such structure. As described above, the indoor units 3A, 3B, 3C, and 3D are connected to the outdoor unit 2 via the liquid-refrigerant connection pipe 5 and the gas-refrigerant connection pipe 6, and constitute a portion of the refrigerant circuit 10.

The configurations of the indoor units 3A, 3B, 3C, and 3D will be described below. The indoor unit 3A is similar in configuration to the indoor units 3B, 3C, and 3D. Accordingly, only the configuration of the indoor unit 3A will be described below. As for the configuration of each of the indoor units 3B, 3C, and 3D, various parts of the indoor unit 3B, 3C, or 3D are designated with a subscript "B", "C", or "D" instead of a subscript "A" used to designate various parts of the indoor unit 3A, and their description will be omitted. Various pipes in each of the indoor units 3B, 3C, and 3D are designated with a subscript "b", "c" or "d" instead of a subscript "a" used to designate various pipes in the indoor unit 3A, and their description will be omitted.

The indoor unit 3A includes, as its main components, an indoor expansion valve 51A, and an indoor heat exchanger 52A. The indoor unit 3A also includes an indoor liquid-refrigerant pipe 53a that connects the liquid-side end of the indoor heat exchanger 52A with the liquid-refrigerant connection pipe 5, and an indoor gas-refrigerant pipe 54a that connects the gas-side end of the indoor heat exchanger 52A with the gas-refrigerant connection pipe 6.

(3-1) Indoor Expansion Valves 51A, 51B, 51C, and 51D

The indoor expansion valve 51A is an electric expansion valve that regulates the flow rate of refrigerant flowing through the indoor heat exchanger 52A while decompressing the refrigerant. The indoor expansion valve 51A is provided to the indoor liquid-refrigerant pipe 53a.

(3-2) Indoor Heat Exchangers 52A, 52B, 52C, and 52D

The indoor heat exchanger 52A is a heat exchanger that functions as an evaporator for refrigerant to cool indoor air, or functions as a radiator for refrigerant to heat indoor air.

(3-3) Indoor Fans 55A, 55B, 55C, and 55D

The indoor unit 3A includes an indoor fan 55A. The indoor fan 55A causes indoor air to be sucked into the indoor unit 3A for heat exchange with refrigerant in the indoor heat exchanger 52A, and then supplies the resulting air into the indoor space as supply air. The indoor fan 55A is driven by an indoor-fan motor 56A.

(3-4) Various Sensors

The indoor unit 3A is provided with various sensors. More specifically, the indoor unit 3A is provided with an indoor heat-exchanger liquid-side sensor 57A that detects the temperature of the refrigerant at the liquid-side end of the indoor heat exchanger 52A, an indoor heat-exchanger gas-side sensor 58A that detects the temperature of the refrigerant at the gas-side end of the indoor heat exchanger 52A, and an indoor air sensor 59A that detects the temperature of indoor air sucked into the indoor unit 3A.

(4) Liquid-Refrigerant Connection Pipe 5 and Gas-Refrigerant Connection Pipe 6

The liquid-refrigerant connection pipe 5 includes, as its main components, a junction pipe portion extending from the outdoor unit 2, and branch pipe portions 5a, 5b, 5c, and 5d, which represent a plurality of (four in this example) branch pipe portions respectively branching off at points before the indoor units 3A, 3B, 3C, and 3D.

The gas-refrigerant connection pipe 6 includes, as its main components, a junction pipe portion extending from the outdoor unit 2, and branch pipe portions 6a, 6b, 6c, and 6d, which represent a plurality of (four in this example) branch pipe portions respectively branching off at points before the indoor units 3A, 3B, 3C, and 3D.

(5) Refrigerant-Channel Branching Component 7

As illustrated in FIG. 1, according to one or more embodiments of the present invention, a refrigerant-channel branching component 7 is used to split the liquid-refrigerant connection pipe 5 into branches that eventually connect to the branch pipe portions 5a, 5b, 5c, and 5d, or to split the gas-refrigerant connection pipe 6 into branches that eventually connect to the branch pipe portions 6a, 6b, 6c, and 6d.

Figure 2:
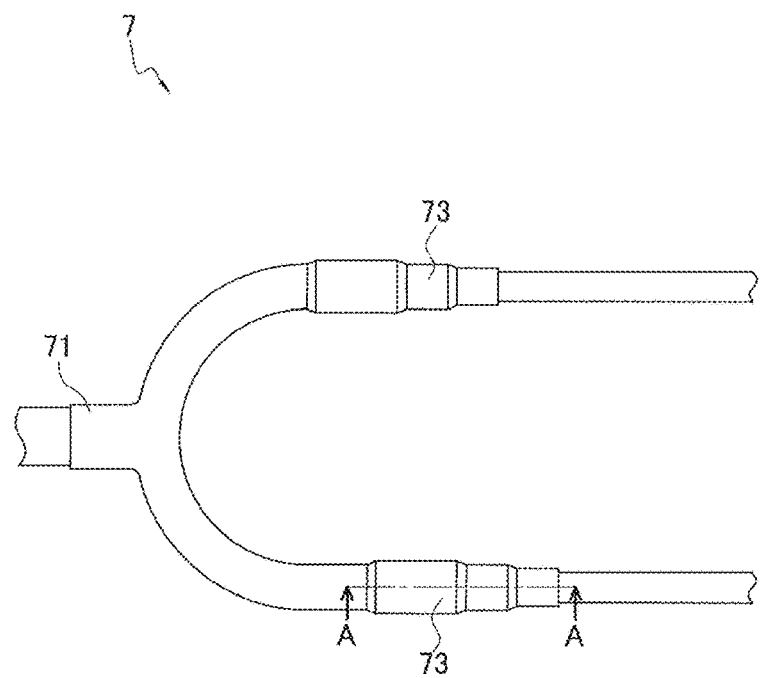
FIG. 2 is a plan view of the refrigerant-channel branching component according to one or more embodiments of the present invention.

FIG. 2 is a plan view of the refrigerant-channel branching component 7. In FIG. 2, the refrigerant-channel branching component 7 has an inlet portion 71, and two outlet portions 73. For example, a ⅜-inch pipe is connected to the inlet portion 71, and a ⅜-inch pipe or a ¼-inch pipe is connected to each outlet portion 73.

Figure 3:
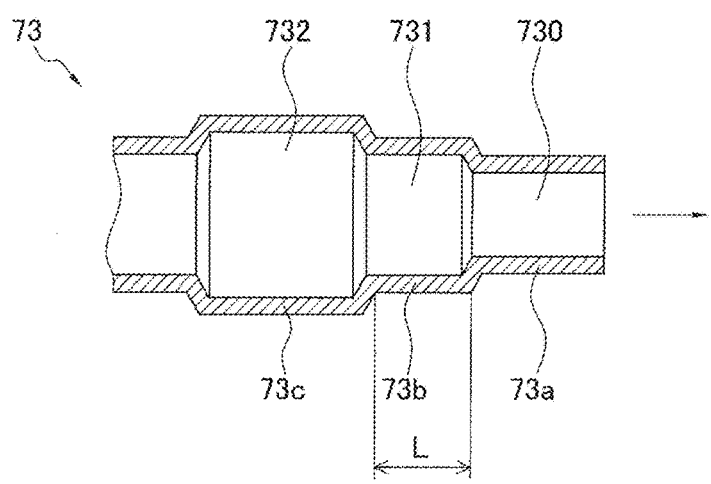
FIG. 3 is a cross-sectional view of an outlet portion illustrated in FIG. 2 taken along a line A-A.

FIG. 3 is a cross-sectional view of each outlet portion 73 illustrated in FIG. 2 taken along a line A-A. In FIG. 3, the outlet portion 73 includes a reference pipe portion 73a, a first pipe portion 73b, and a second pipe portion 73c that differ in their radial dimensions. A reference space 730 is defined inside the reference pipe portion 73a, a first space 731 is defined inside the first pipe portion 73b, and a second space 732 is defined inside the second pipe portion 73c.

In the present case, a ¼-inch pipe with an outside diameter of 6.35 mm is inserted into the reference space 730 of the reference pipe portion 73a. The first pipe portion 73b has an outside diameter of 7.93 mm. The first space 731 of the first pipe portion 73b is a cylindrical space located adjacent to the reference space 730 and having an inside diameter set to a value (6.33 mm) greater than the inside diameter (4.75 mm) of a ¼-inch pipe. In other words, the first pipe portion 73b is a 2.5/8-inch pipe. The dimension of the first space 731 in the direction of refrigerant flow is set to a value greater than or equal to 10 mm.

The second space 732 is a cylindrical space located adjacent to the first space 731 and having an inside diameter set to a value (9.52 mm) greater than the inside diameter of the first space 731. This inside diameter allows for insertion of a ⅜-inch pipe.

As described above, the first pipe portion 73b corresponding to a 2.5/8-inch pipe is interposed between the second pipe portion 73c and the reference pipe portion 73a. This configuration is employed to create the same state as that in which, before refrigerant from the second space 732 of the second pipe portion 73c flows into the ¼-inch pipe inserted in the reference space 730 of the reference pipe portion 73a, the refrigerant passes through a 2.5/8-inch pipe once. This allows for gradual contraction of the channel cross-sectional area, and consequently prevents the cross-sectional area from being constricted all at once, thus reducing the occurrence of "bubble clogging" and "pressure fluctuations".

Figure 4A:
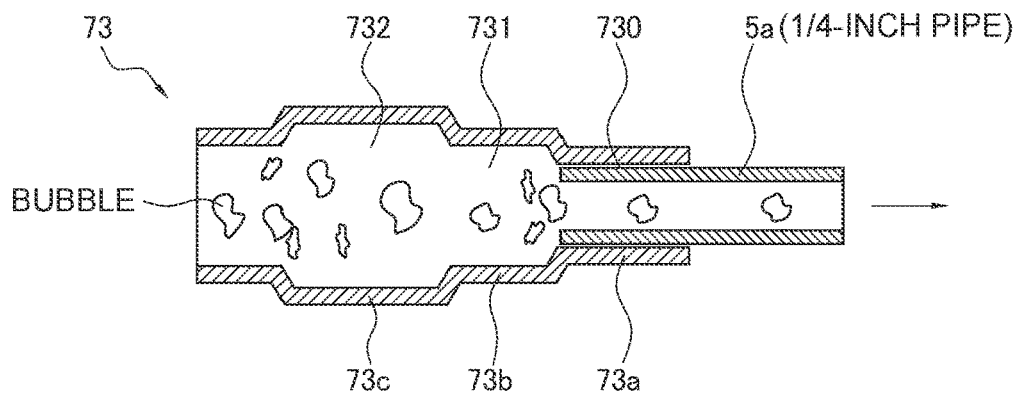
FIG. 4A is a cross-sectional view of an outlet portion when a branch pipe illustrated in FIG. 1 is a ¼-inch pipe and inserted into a reference space of the outlet portion.
Figure 4B:
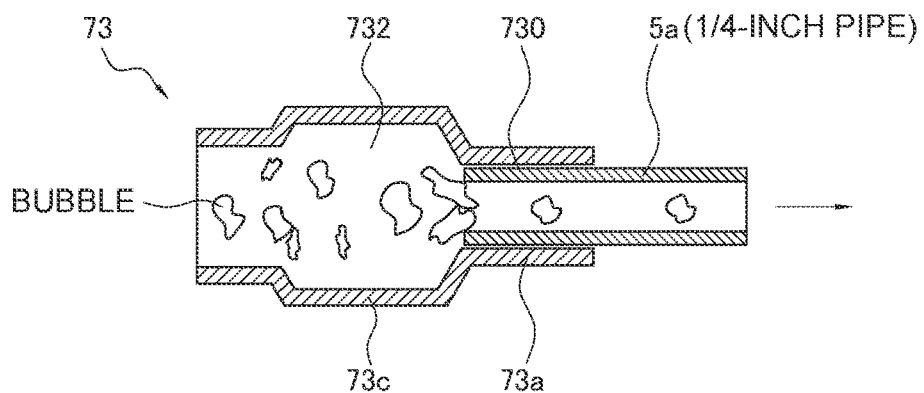
FIG. 4B is a cross-sectional view of the outlet portion illustrated in FIG. 4A with a first space removed.

For example, FIG. 4A is a cross-sectional view of the outlet portion 73 when the branch pipe portion 5a illustrated in FIG. 1 is a ¼-inch pipe, and the branch pipe portion 5a is inserted in the reference space 730 of the outlet portion 73. FIG. 4B is a cross-sectional view of the outlet portion 73 illustrated in FIG. 4A with the first space 731 removed from the outlet portion 73.

First, FIG. 4B will be described below. In FIG. 4B, during cooling operation in which gas-liquid two-phase refrigerant passes to the branch pipe portion 5a, the refrigerant flows in the outlet portion 73 of the refrigerant-channel branching component 7 such that the flow is constricted from the second space 732, which is a cylindrical space having a large diameter, into the branch pipe portion 5a having a small diameter. The channel cross-sectional area is thus constricted all at once.

Accordingly, as refrigerant flows from the second space 732 into the branch pipe portion 5a, a state in which bubbles block the inflow port of the branch pipe portion 5a (to be referred to as "bubble-clogging state" hereinafter), and a state in which the blocking bubbles pass through the inflow port (to be referred to as "bubble-released state" hereinafter)

are repeated. Each repetition of these states causes pressure fluctuations. Such pressure fluctuations can cause unwanted increase of noise.

By contrast, in the outlet portion 73 of the refrigerant-channel branching component 7 illustrated in FIG. 4A, the channel cross-sectional area decreases in the order of the second space 732, the first space 731, and the interior of the ¼-inch pipe. More specifically, the percentage of contraction in channel cross-sectional area from the second space 732 to the first space 731 is 69.2%, and the percentage of contraction in channel cross-sectional area from the first space 731 to the interior of the ¼-inch pipe is 35.9%. These percentages of contraction are less than the percentage of contraction (25%) as illustrated in FIG. 4B from the channel cross-sectional area in the second space 732 (which corresponds to the area of a circle with a diameter equal to the outside diameter of a ⅜-inch pipe) to the channel cross-sectional area in the interior of the ¼-inch pipe (which corresponds to the area of a circle with a diameter equal to the outside diameter of a ¼-inch pipe).

Therefore, during cooling operation in which gas-liquid two-phase refrigerant passes to the branch pipe portion 5a, the refrigerant flow is constricted stepwise, thus preventing the channel cross-sectional area from being constricted all at once. This configuration ensures that when refrigerant flows from the first space 731 into the branch pipe portion 5a, the "bubble-clogging state" and the "bubble-released state" are not repeated, thus reducing the occurrence of "pressure fluctuations".

As described above, when it is desired to connect the outlet portion 73 with a ¼-inch pipe, this connection can be achieved by inserting the ¼-inch pipe into the reference space 730. It may be also desired in some cases to connect the outlet portion 73 with a ⅜-inch pipe. To this end, according to one or more embodiments of the present invention, the second space 732 is adapted for a ⅜-inch pipe.

Figure 5:
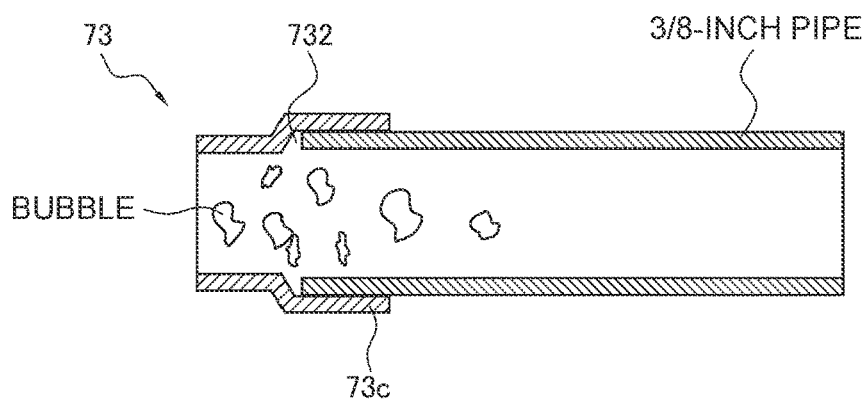
FIG. 5 is a cross-sectional view of an outlet portion according to one or more embodiments of the present invention when connected with a ⅜-inch pipe.

FIG. 5 is a cross-sectional view of the outlet portion 73 when connected with a ⅜-inch pipe. Referring to FIG. 5, the above-mentioned connection can be achieved by cutting, at some midpoint, the second pipe portion 73c defining the second space 732 of the outlet portion 73, and inserting the ⅜-inch pipe into the cut second pipe portion 73c.

(6) Control Unit 19

The control unit 19 is communicatively connected with control boards or other components (not illustrated) provided in the outdoor unit 2 and the indoor units 3A, 3B, 3C, and 3D. For the convenience of illustration, the control unit 19 is depicted in FIG. 1 as being positioned away from the outdoor unit 2 and the indoor units 3A, 3B, 3C, and 3D.

The control unit 19 controls various component devices of the air conditioner 1 (which in this case are the outdoor unit 2 and the indoor units 3A, 3B, 3C, and 3D) based on detection signals or other information obtained by the various sensors mentioned above. In other words, the control unit 19 controls operation of the entire air conditioner 1. Cooling operation will be described below as an example.

(7) Operation of Air Conditioner 1

The air conditioner 1 performs cooling operation and heating operation. In cooling operation, two-phase transport of refrigerant is performed in which, by using the liquid-pressure-regulating expansion valve 26 provided to the outdoor liquid-refrigerant pipe 34, refrigerant in a gas-liquid two-phase state is delivered from the outdoor unit 2 toward the indoor units 3A, 3B, 3C, and 3D through the liquid-refrigerant connection pipe 5.

Further, in cooling operation, the following operations are performed by using the refrigerant return pipe 41 and the refrigerant cooler 45: cooling refrigerant in a portion of the outdoor liquid-refrigerant pipe 34 between the refrigerant cooler 45 and the liquid-pressure-regulating expansion valve 26; and delivering refrigerant to the compressor 21. These operations are performed by the control unit 19 that controls the component devices of the air conditioner 1.

In cooling operation, the switching mechanism 22 is switched to the outdoor radiation state (the state indicated by the solid lines inside the switching mechanism 22 in FIG. 1), and the compressor 21, the outdoor fan 24, and the indoor fans 55A, 55B, 55C, and 55D are driven.

Refrigerant at a high pressure discharged from the compressor 21 is delivered to the outdoor heat exchanger 23 through the switching mechanism 22. In the outdoor heat exchanger 23, the refrigerant is cooled to condense in heat exchange with outdoor air supplied by the outdoor fan 24. The resulting refrigerant then leaves the outdoor unit 2 via the outdoor expansion valve 25, the refrigerant cooler 45, the liquid-pressure-regulating expansion valve 26, and the liquid-side shutoff valve 27.

The refrigerant leaving the outdoor unit 2 is split into separate streams and delivered to the indoor units 3A, 3B, 3C, and 3D via the liquid-refrigerant connection pipe 5. The refrigerant is then decompressed to a low pressure by each of the indoor expansion valves 51A, 51B, 51C, and 51D, and delivered to each of the indoor heat exchangers 52A, 52B, 52C, and 52D.

In each of the indoor heat exchangers 52A and 52B, the refrigerant is heated to evaporate in heat exchange with indoor air supplied from the indoor space by the indoor fan 55A, 55B, 55C, or 55D. The refrigerant then leaves each of the indoor units 3A, 3B, 3C, and 3D. The indoor air cooled in each of the indoor heat exchanger 52A, 52B, 52C, and 52D is delivered to the indoor space to thereby cool the indoor space.

The refrigerant streams leaving the indoor units 3A, 3B, 3C, and 3D are combined and delivered to the outdoor unit 2 via the gas-refrigerant connection pipe 6. The resulting refrigerant is then sucked into the compressor 21 via the gas-side shutoff valve 28, the switching mechanism 22, and the accumulator 29.

During the cooling operation mentioned above, two-phase transport of refrigerant is performed in which, by using the liquid-pressure-regulating expansion valve 26, refrigerant in a gas-liquid two-phase state is delivered toward the indoor units 3A, 3B, 3C, and 3D through the liquid-refrigerant connection pipe 5.

In this case, the liquid-refrigerant connection pipe 5 is split into branches to deliver refrigerant into a plurality of indoor units connected in parallel. Accordingly, noise may occur due to an abrupt constriction of refrigerant flow in the branching portion. However, according to one or more embodiments of the present invention, the first pipe portion 73b corresponding to a 2.5/8-inch pipe is interposed between the second pipe portion 73c and the reference pipe portion 73a to allow for gradual contraction of the channel cross-sectional area. This prevents the channel cross-sectional area from being constricted all at once, thus reducing the occurrence of noise.

As a result of research conducted by the present applicant, it has been found that a dimension L, which is the dimension in the refrigerant flow direction of the first pipe portion 73b having an outside diameter equivalent to 2.5/8 inch, has a large effect on noise reduction.

Figure 6:
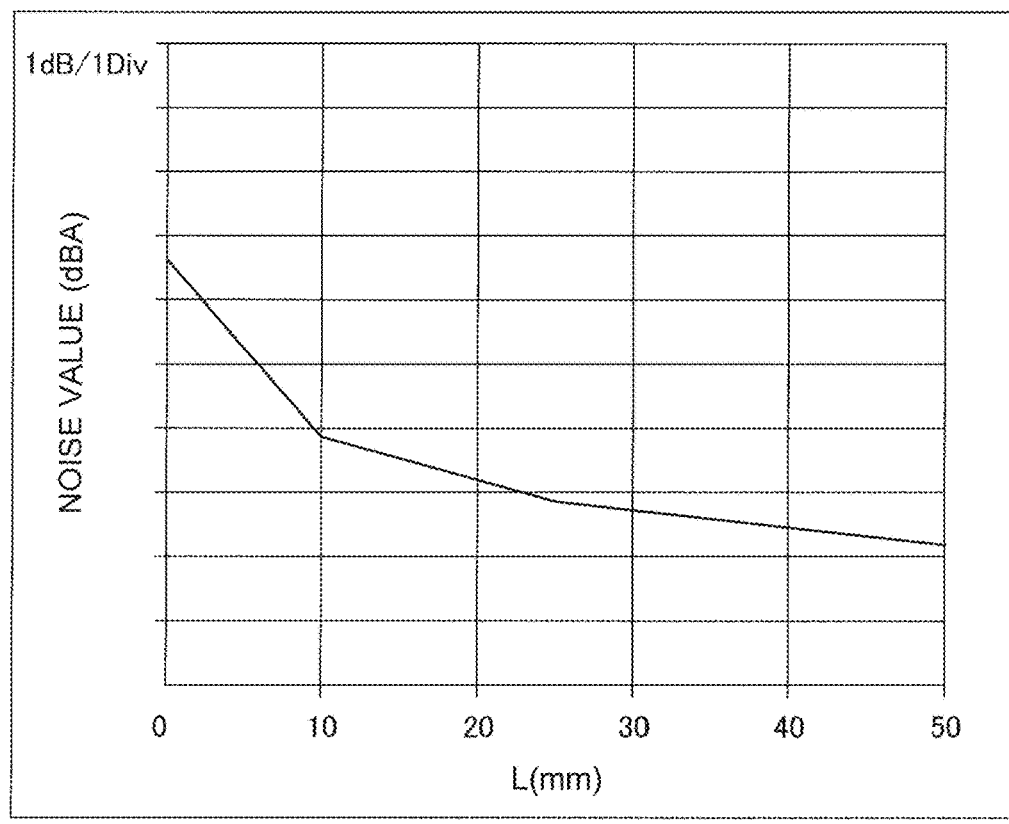
FIG. 6 is a graph illustrating the relationship between a dimension L of a second space in the direction of refrigerant flow, and noise.

FIG. 6 is a graph illustrating the relationship between the dimension L of the second space 732 in the direction of refrigerant flow, and noise. In FIG. 6, noise decreases sharply (by approximately 2.7 dB) when the dimension L of the second space 732 in the direction of refrigerant flow is in the range from 0 and 10 mm. For values of the dimension L in the range from 10 mm to 25 mm, although the gradient of noise reduction decreases, noise decreases by approximately 1 dB. Further, for values of the dimension L in the range from 25 mm to 50 mm, the gradient of noise reduction decreases even further, and noise decreases by only approximately 0.6 dB. It is thus assumed that at 50 mm or more, noise converges to a constant value.

From these results, the dimension L may be greater than or equal to 10 mm, or greater than or equal to 50 mm (8) Characteristic Features (8-1)

In the outlet portion 73 of the refrigerant-channel branching component 7, the channel cross-sectional area decreases in the order of the second space 732, the first space 731, and the reference space 730. The refrigerant flow is thus constricted stepwise. This prevents the channel cross-sectional area from being constricted all at once, thus reducing the occurrence of "bubble clogging" and "pressure fluctuations".

(8-2)

When it is desired to connect the outlet portion 73 with a ¼-inch pipe, this connection can be achieved by inserting the ¼-inch pipe into the reference space 730. When it is desired to connect the outlet portion 73 with a ⅜-inch pipe, this connection can be achieved by cutting, at some midpoint, the pipe defining the second space 732, and inserting the ⅜-inch pipe into the cut pipe.

(8-3)

The percentage of contraction in channel cross-sectional area from the second space 732 to the first space 731, and the percentage of contraction in channel cross-sectional area from the first space 731 to the interior of the reference connection pipe are less than the percentage of contraction from the area of a circle with a diameter equal to the outside diameter of a ⅜-inch pipe to the area of a circle with a diameter equal to the inside diameter of a ¼-inch pipe. This configuration allows for gradual contraction of channel cross-sectional area, thus preventing the channel cross-sectional area from being constricted all at once.

(8-4)

The first pipe portion 73*b* defining the first space 731 has an outside diameter of 2.5/8 inch. This configuration results in the same state as that in which, when refrigerant from the second space 732 flows into the reference connection pipe inserted in the reference space 730, the refrigerant passes through a 2.5/8-inch pipe once. This allows for gradual contraction of the channel cross-sectional area, thus preventing the channel cross-section area from being constricted all at once.

(8-5)

The dimension L of the first pipe portion 73*b* in the direction of refrigerant flow is set to a value greater than or equal to 10 mm (or, greater than or equal to 50 mm). Noise reduction can be thus achieved.

(9) Modification

In the refrigerant-channel branching component 7 according to the above-mentioned embodiments, the second pipe portion 73*c* defining the second space 732, the first pipe portion 73*b* defining the first space 731, and the reference pipe portion 73*a* defining the reference space 730 are formed integrally.

However, these pipe portions may not necessarily be formed integrally. As a modification of one or more embodiments, a configuration is proposed in which the second pipe portion 73*c* defining the second space 732, and the first pipe portion 73*b* defining the first space 731 are separate from each other.

Figure 7:
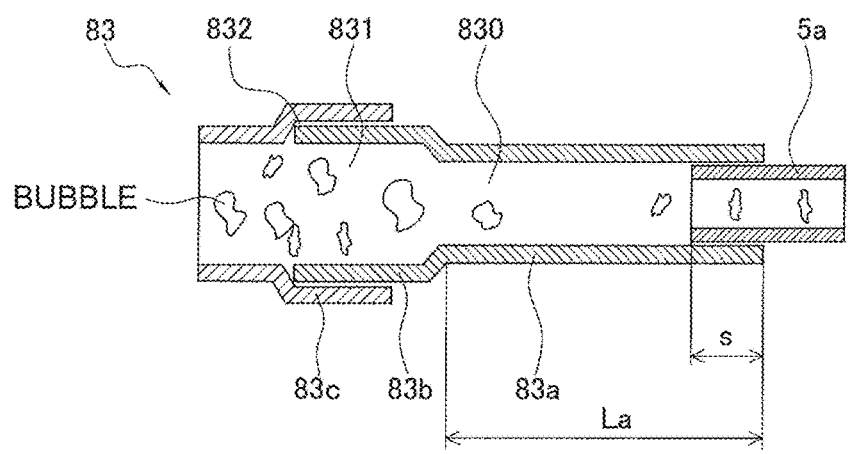
FIG. 7 is a cross-sectional view of the outlet portion of a refrigerant-channel branching component according to a modification of one or more embodiments of the present invention.

FIG. 7 is a cross-sectional view of an outlet portion 83 of a refrigerant-channel branching component according to the modification. In FIG. 7, the outlet portion 83 has a shape identical to the "shape obtained by cutting the second pipe portion 73*c* at some midpoint" according to the above-mentioned embodiments illustrated in FIG. 5. A second space 832 is defined inside a second pipe portion 83*c*. In other words, one end portion of a ⅜-inch pipe is enlarged into a pipe with "an outside diameter of 11.12 mm and an inside diameter 9.52 mm".

A first pipe portion 83*b* and a reference pipe portion 83*a* are formed integrally. A reference space 830 is defined inside the reference pipe portion 83*a*, and a first space 831 is defined inside the first pipe portion 83*b*.

A ¼-inch pipe with an outside diameter of 6.35 mm is inserted into the reference space 830 of the reference pipe portion 83*a*. The first pipe portion 83*b* has an outside diameter of 7.93 mm. The first space 831 of the first pipe portion 83*b* is a cylindrical space located adjacent to the reference space 830 and having an inside diameter set to a value (6.33 mm) greater than the inside diameter (4.75 mm) of the ¼-inch pipe. In other words, the first pipe portion 83*b* is formed by enlarging one end of the reference pipe portion into a 2.5/8-inch pipe.

If the second pipe portion 83*c* and the first pipe portion 83*b* are formed integrally, the respective dimensions of the second pipe portion 83*c* and the first pipe portion 83*b* in the direction of refrigerant flow are subject to manufacturing restrictions. By contrast, by forming the second pipe portion 83*c* and the first pipe portion 83*b* separately, the respective dimensions of the second pipe portion 83*c* and the first pipe portion 83*b* in the direction of refrigerant flow can be set freely irrespective of the manufacturing method used.

Figure 8:
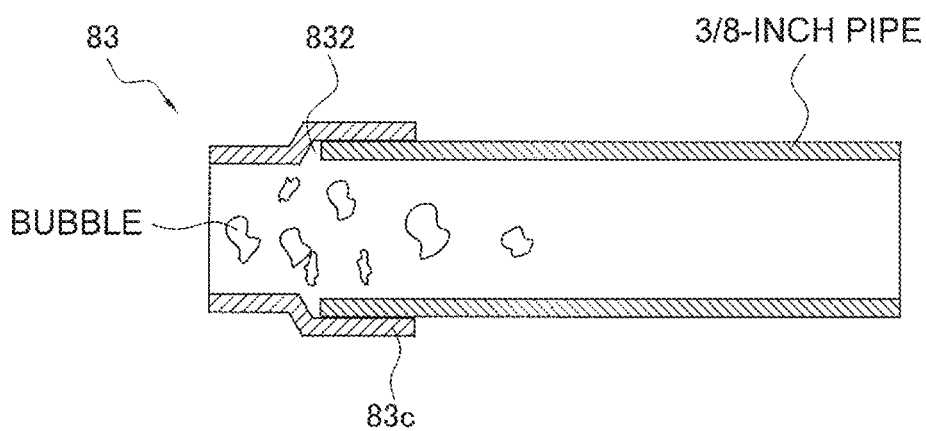
FIG. 8 is a cross-sectional view of the outlet portion of the refrigerant-channel branching component according to the modification when the outlet portion is connected with a ⅜-inch pipe.

As described above, when it is desired to connect the outlet portion 83 with a ¼-inch pipe, this connection can be achieved by inserting the ¼-inch pipe into the reference space 830. It may be also desired in some cases to connect the outlet portion 83 with a ⅜-inch pipe. In this case, the ⅜-inch pipe can be inserted into the second space 832 of the outlet 83 as illustrated in FIG. 8. This connection is substantially the same as in the above-mentioned embodiments illustrated in FIG. 5.

In this modification, as illustrated in FIG. 7, the reference pipe portion 83*a* defining the reference space 830 has a dimension La in the direction of refrigerant flow that is set longer than the insertion length s of the reference connection pipe (¼-inch pipe) into the reference space 830 to thereby reduce noise.

The present invention can be applied to a wide variety of air conditioners in which an outdoor liquid-refrigerant pipe connecting the liquid-side end of an outdoor heat exchanger with a liquid-refrigerant connection pipe is provided with a liquid-pressure-regulating expansion valve that decompresses refrigerant such that the refrigerant flows through the liquid-refrigerant connection pipe in a gas-liquid two phase state.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 1 air conditioner (refrigeration apparatus)
2 outdoor unit
3A, 3B, 3C, 3D indoor unit
5 liquid-refrigerant connection pipe (connection pipe)
5a reference connection pipe (branch pipe portion)
6 gas-refrigerant connection pipe (connection pipe)
7 refrigerant-channel branching component
71 inlet portion
73 outlet portion
73a reference pipe portion
73b first pipe portion
73c second pipe portion
730 reference space
731 first space
732 second space
83 outlet portion
83a reference pipe portion
83b first pipe portion
83c second pipe portion
830 reference space
831 first space
832 second space

The invention claimed is:

1. A refrigeration apparatus comprising:
a refrigerant-channel branching component that connects a connection pipe connected toward an outdoor unit with connection pipes directed toward a plurality of indoor units; and
an expansion valve that decompresses refrigerant flowing from the outdoor unit toward the connection pipe, wherein
the refrigerant-channel branching component comprising:
    an inlet portion; and
    outlet portions, wherein
    one of the outlet portions comprises:
        a reference space into which a reference connection pipe with a predetermined outside diameter is inserted;
        a first space that is coaxially adjacent to the reference space and has an inside diameter greater than an inside diameter of the reference connection pipe; and
        a second space that is coaxially adjacent to the first space and has an inside diameter greater than the inside diameter of the first space,
gas-liquid two-phase refrigerant flows in the outlet portions,
the reference connection pipe is a ¼-inch pipe,
a connection pipe with a diameter that corresponds to the inside diameter of the second space is a ⅜-inch pipe, and
a percentage of contraction in channel cross-sectional area from the second space to the first space, and a percentage of contraction in channel cross-sectional area from the first space to an interior of the reference connection pipe are less than a percentage of contraction from an area of a circle with a diameter equal to an outside diameter of the ⅜-inch pipe to an area of a circle with a diameter equal to an inside diameter of the ¼-inch pipe.

2. A refrigeration apparatus comprising:
a refrigerant-channel branching component that connects a connection pipe connected toward an outdoor unit with connection pipes directed toward a plurality of indoor units; and
an expansion valve that decompresses refrigerant flowing from the outdoor unit toward the connection pipe, wherein
the refrigerant-channel branching component comprising:
    an inlet portion; and
    outlet portions, wherein
    one of the outlet portions comprises:
        a reference space into which a reference connection pipe with a predetermined outside diameter is inserted;
        a first space that is coaxially adjacent to the reference space and has an inside diameter greater than an inside diameter of the reference connection pipe; and
        a second space that is coaxially adjacent to the first space and has an inside diameter greater than the inside diameter of the first space,
in a direction of refrigerant flow during a cooling operation mode of the refrigeration apparatus,
    the connection pipe is disposed:
    immediately upstream of the refrigerant-channel branching component, and
    downstream the expansion valve, and
gas-liquid two-phase refrigerant flows in the outlet portions.

3. The refrigeration apparatus according to claim 2, wherein
the reference connection pipe is a ¼-inch pipe, and
a connection pipe with a diameter that corresponds to the inside diameter of the second space is a ⅜-inch pipe.

4. The refrigeration apparatus according to claim 2, wherein a first pipe portion that defines the first space has an outside diameter of 2.5/8 inch.

5. The refrigeration apparatus according to claim 2, wherein a second pipe portion that defines the second space is separate from a first pipe portion that defines the first space.

6. The refrigeration apparatus according to claim 2, wherein a reference pipe portion that defines the reference space has a dimension, in a direction of refrigerant flow, greater than an insertion length of the reference connection pipe into the reference space.

7. The refrigeration apparatus according to claim 2, wherein the first space has a dimension in a direction of refrigerant flow greater than or equal to 10 mm.

8. The refrigeration apparatus according to claim 2, wherein the refrigeration apparatus decompresses liquid refrigerant from the outdoor unit once to turn the liquid refrigerant into a gas-liquid two-phase state for transport.

* * * * *